July 7, 1925.
J. W. MACKLIN
1,544,669
METAL CASING FOR LEAF SPRING COVERS
Filed Jan. 10, 1922
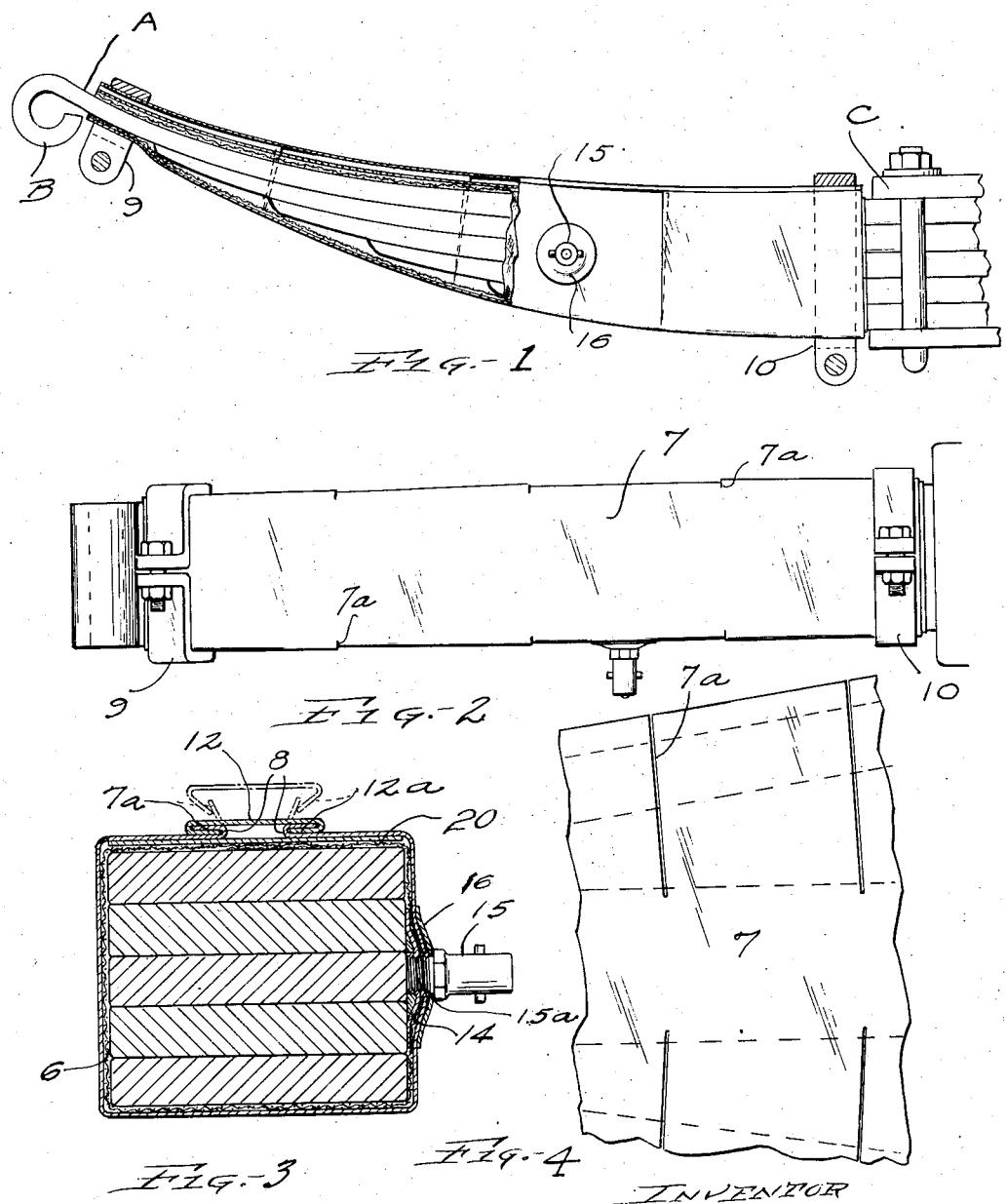

Patented July 7, 1925.

1,544,669

UNITED STATES PATENT OFFICE.

JUSTIN W. MACKLIN, OF LAKEWOOD, OHIO, ASSIGNOR, BY MESNE ASSIGNMENTS, TO ALBERT E. HODGINS, OF CLEVELAND, OHIO.

METAL CASING FOR LEAF-SPRING COVERS.

Application filed January 10, 1922. Serial No. 528,146.

*To all whom it may concern:*

Be it known that I, JUSTIN W. MACKLIN, a citizen of the United States, residing at Lakewood, in the county of Cuyahoga and State of Ohio, have invented a certain new and useful Improvement in a Metal Casing for Leaf-Spring Covers, of which the following is a full, clear, and exact description, reference being had to the accompanying drawings.

This invention relates to spring covers such as are used for protecting the springs of automobiles from dust and dirt.

My invention contemplates the construction of a cover which in addition to providing an effective protecting covering for a spring, adapts it for a system of high pressure lubrication. In addition, my invention is concerned with the provision of a cover which may be cheaply and quickly attached to existing springs without disconnecting them from a vehicle, and which permits the normal flexing operation of the leaves without allowing lubricant contained under pressure within the casing to escape therefrom.

My invention is illustrated as embodying a cover which is formed from a single strip or sheet of light sheet metal, and which is adapted to engage a spring on three sides, and flex with the movement of the spring, there being a suitable closure member and securing devices extending along the fourth side.

The means for accomplishing the above objects will be more fully set forth in the following description which relates to the drawings and the essential characteristics of my invention will be summarized in the claims.

In the drawings, Fig. 1 is an elevation partly in section of a spring, having a cover embodying my invention secured thereto; Fig. 2 is a bottom view of the spring and cover shown in Fig. 1; Fig. 3 is a transverse section taken through the spring showing the manner of securing the casing thereto; Fig. 4 is a portion of a blank used to form the casing.

In the various figures, I have illustrated my invention in connection with a cover for a laminated spring, the top leaf of which is designated A. The upper end of the spring is shown as terminating in a loop B while the other end is illustrated as secured by a clamp C to the axle of the vehicle. The cover extends between the loop and clamp so as to form a closed chamber into which lubricant under pressure may be injected and retained, in contact with the spring flexed during the movement of the vehicle.

A lubricant-proof jacket 6 shown as fabric such as canvas, is wrapped entirely around the spring, and outside of and surrounding this jacket is a metallic casing 7. The ends of the casing are shown secured by clamps 9 and 10 in close engagement with the leaves of the spring. The meeting edges of the jacket 6 are preferably overlapped and covered by a flexible metal strip 20 which extends the entire length of the casing and acts as a protective medium, for preventing the jacket from being cut, when the closure member 12 is fitted over the ends 8 of the casing and pressed flat against the spring as indicated in Fig. 3.

The casing proper is formed from a strip of light sheet metal which is shaped to envelop the spring and to correspond with the taper thereof when brought into engagement therewith. To provide a one-piece casing cut from a single sheet and which readily conforms to the shape of the spring and at the same time permits flexing thereof, this sheet is cut or slit inwardly from the outside at spaced intervals, as at 7ª. These slits extend inwardly from the edges of the casing an amount sufficient to provide a series of wings adapted to lie in close proximity to the sides of the spring, leaving an uncut strip longitudinally of the casing, which is adapted to lie adjacent the bottom of the spring. In this way, the taper of the spring causes the adjacent wings to overlap, as shown in Fig. 1, when the casing is folded around the spring and attached thereto. By reason of the overlapping feature, the spring may be flexed without opening a seam and without fracturing the casing.

To secure the casing in position, I provide a closure member 12 which is flanged inwardly on each side so as to engage similarly flanged portions on each of the wings formed by the slits in the cover sheet. This closure member extends the entire length of the casing and is adapted to be sprung over the flanges as shown in the broken lines in Fig. 3. A construction of this character, permits one wing to move freely over the edge of the next adjacent one and at the same time prevents the jacket from bulging outwardly when the fluid under pressure is injected therein.

As a means for permitting lubricant to be injected within the jacket, I have shown a nut 14 which is adapted to receive a valve 15 projecting laterally from the casing. The threaded portion 15ª of this valve draws the nut tightly against the jacket and binds it against a washer 16 outside the casing.

The manner of constructing a spring cover embodying my invention is as follows: A fabric jacket 6 having a nut 14 secured thereto, is placed over the spring to be covered, and a strip 20 is positioned over the lapped edges of the jacket. The casing 7, having the slits 7ª previously cut therein, is fitted over the jacket and the edges of the wings are flanged outwardly as shown in the broken lines in Fig. 3. Then the closure member 12 is placed over the flanged portions and pressed flat against the casing, whereupon the extreme ends are clamped, as at 9 and 10, and the valve 15 is threaded into the nut 14. The cover is then ready to receive lubricant under pressure.

From the foregoing description, it will be seen that my spring cover may be cheaply constructed, without disconnecting the spring from a vehicle and may be readily attached. An advantage of such construction is that the spring may be readily flexed without impairing the effectiveness of the casing as a chamber for lubricant under pressure.

Having thus described my invention, I claim:—

1. A spring cover of the character described, consisting of a sheet of metal embracing three sides of the spring and so curved that one side has a greater linear distance from end to end than any other, the sheet being slit on two of its three sides leaving the intermediate strip continuous, the slits occurring at intervals such that the intermediate sections may overlap at their edges, and means for engaging the edges of the sheet to close the fourth side of the cover.

2. A spring cover of the character described, consisting of a sheet of metal embracing three sides of the spring, the sheet being slit to form wings on opposite sides, the slits occurring at intervals such that the intermediate sections may overlap at their edges, and means for engaging the outer edges of the winds to close the fourth side of the cover.

3. A case for a laminated vehicle spring consisting essentially of two pieces of metal, one of which has a continuous strip along one side of the spring, integral wings extending from the sides of the strip and overlapping by reason of approaching the shorter side of the spring, and means for effecting an engagement between the edges of the overlapping sections and the strip on the shorter side of the spring.

4. A casing for a laminated vehicle spring consisting essentially of a sheet of metal embracing three sides of a spring, wings integral with said sheet and projecting from opposite sides thereof, and means adjacent the fourth side of the spring for effecting an engagement between the outer edges of the wings to close the cover.

5. A spring cover consisting essentially of two strips of metal, one of which extends along the longer side of the spring and the other along the shorter side, the intermediate sides being covered by integral wings extending from the first mentioned strip and overlapping at their meeting edges progressively greater distances as they approach the shorter side of the spring.

6. A blank adapted to be formed into a vehicle spring cover, comprising a metallic sheet, having a plurality of spaced apart slits formed therein extending from each side margin of the blank transversely thereof, the length of the slits being greater than the depth of the side wall of the cover to be formed.

In testimony whereof, I hereunto affix my signature.

JUSTIN W. MACKLIN.